United States Patent
Gillon

(10) Patent No.: US 9,652,251 B2
(45) Date of Patent: May 16, 2017

(54) PRE-BOOT DIAGNOSTIC DISPLAY

(71) Applicant: Dell Products L.P., Round Rock, TX (US)

(72) Inventor: James T. Gillon, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 197 days.

(21) Appl. No.: 14/523,644

(22) Filed: Oct. 24, 2014

(65) Prior Publication Data

US 2016/0117176 A1    Apr. 28, 2016

(51) Int. Cl.
  *G06F 9/00*     (2006.01)
  *G06F 15/177*   (2006.01)
  *G06F 9/44*     (2006.01)

(52) U.S. Cl.
  CPC .......... *G06F 9/4403* (2013.01); *G06F 9/4406* (2013.01)

(58) Field of Classification Search
  CPC .............................. G06F 9/4401; G06F 9/4406
  See application file for complete search history.

(56) References Cited

U.S. PATENT DOCUMENTS

| | | | | |
|---|---|---|---|---|
| 5,670,969 A * | 9/1997 | Yamagami | ............ | G06F 1/1645 345/3.1 |
| 5,710,570 A * | 1/1998 | Wada | .................... | G06F 3/1431 345/3.2 |
| 6,487,656 B1 * | 11/2002 | Kim | ...................... | G06F 9/4403 713/2 |
| 2003/0070102 A1 * | 4/2003 | Kondo | .................... | G06F 21/31 726/23 |
| 2005/0268081 A1 * | 12/2005 | Han | ...................... | G06F 9/4411 713/1 |
| 2007/0112989 A1 * | 5/2007 | Iwaki | .................... | G06F 1/1632 710/303 |
| 2010/0245391 A1 * | 9/2010 | Chen | ..................... | G06F 3/1415 345/649 |
| 2010/0253691 A1 * | 10/2010 | Lin | ....................... | G06F 3/1431 345/520 |
| 2010/0268924 A1 * | 10/2010 | Fujii | ..................... | G06F 9/4401 713/1 |
| 2013/0318216 A1 * | 11/2013 | Sakamaki | ........... | H04L 41/0813 709/221 |
| 2014/0223158 A1 * | 8/2014 | Zhou | .................... | G06F 9/4405 713/2 |
| 2015/0301769 A1 * | 10/2015 | Yamashita | ............ | G06F 3/1205 358/1.15 |

OTHER PUBLICATIONS

Guide on DisplayPort by VESA, at http://en.wikipedia.org/wiki/DisplayPort, printed Oct. 2014, 13 pages.

* cited by examiner

*Primary Examiner* — Phil Nguyen
(74) *Attorney, Agent, or Firm* — Baker Botts L.L.P.

(57) ABSTRACT

A pre-boot diagnostic display may be controlled by an embedded controller of an information handling system. The embedded controller may generate pre-boot diagnostic content during power on self-test (POST) of the information handling system. The pre-boot diagnostic content may be displayed to a user on a primary display of the information handling system during POST and before the information handling system is booted to an operating system.

17 Claims, 3 Drawing Sheets

PRE-BOOT DIAGNOSTIC DISPLAY

BACKGROUND

Field of the Disclosure

This disclosure relates generally to information handling systems and more particularly to pre-boot diagnostic display functionality.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The use of embedded controllers in information handling systems has increased in recent years. Broadly speaking, an embedded controller (EC) may be a device, system, or apparatus for remote monitoring or management of an information handling system. The embedded controller may be a secondary information handling system embedded in the information handling system. This secondary information handling system, in the form of the embedded controller, may include additional functionality. In many information handling systems having an integrated display, such as laptops, notebooks, netbooks, tablets, 2-in-1 systems, all-in-one systems, among others, the embedded controller may interface directly with the display in certain situations. For example, the embedded controller may support built-in self-test (BIST) of a liquid crystal display (LCD) monitor where the embedded controller asserts a general purpose input/output (GPIO) signal to send a display controller of the LCD monitor into a self-test mode prior to boot of the information handling system. However, the diagnostic capability of LCD BIST functionality provided to a user of the information handling system may be limited to basic display connectivity and operation.

SUMMARY

In one aspect, a disclosed method includes receiving, by an embedded controller of an information handling system, a power signal to power on the information handling system. Responsive to receiving the power signal, the method may include outputting a display mode signal to a display controller of a display coupled to the information handling system, the display mode signal indicating to the display controller to display pre-boot display content on the display. Prior to booting the information handling system, the method may also include outputting the pre-boot display content to the display controller.

In certain embodiments, the method includes generating the pre-boot display content during booting of the information handling system, outputting the pre-boot display content during the booting using a logic interface. The logic interface may emulate a sideband channel of a video interface to the display controller.

Another disclosed aspect includes an information handling system, comprising a processor subsystem having access to a first memory, and an embedded controller comprising a secondary processor having access to a second memory, the second memory storing instructions executable by the secondary processor.

A further disclosed aspect includes an embedded controller for an information handling system having a primary processor and a primary memory, the embedded controller comprising a secondary processor having access to a second memory, the second memory including an embedded storage partition and the second memory storing instructions executable by the secondary processor.

An additional disclosed aspect includes an article of manufacture comprising a non-transitory computer-readable medium storing instructions executable by a secondary processor, while an information handling system comprises a processor subsystem and the second processor.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
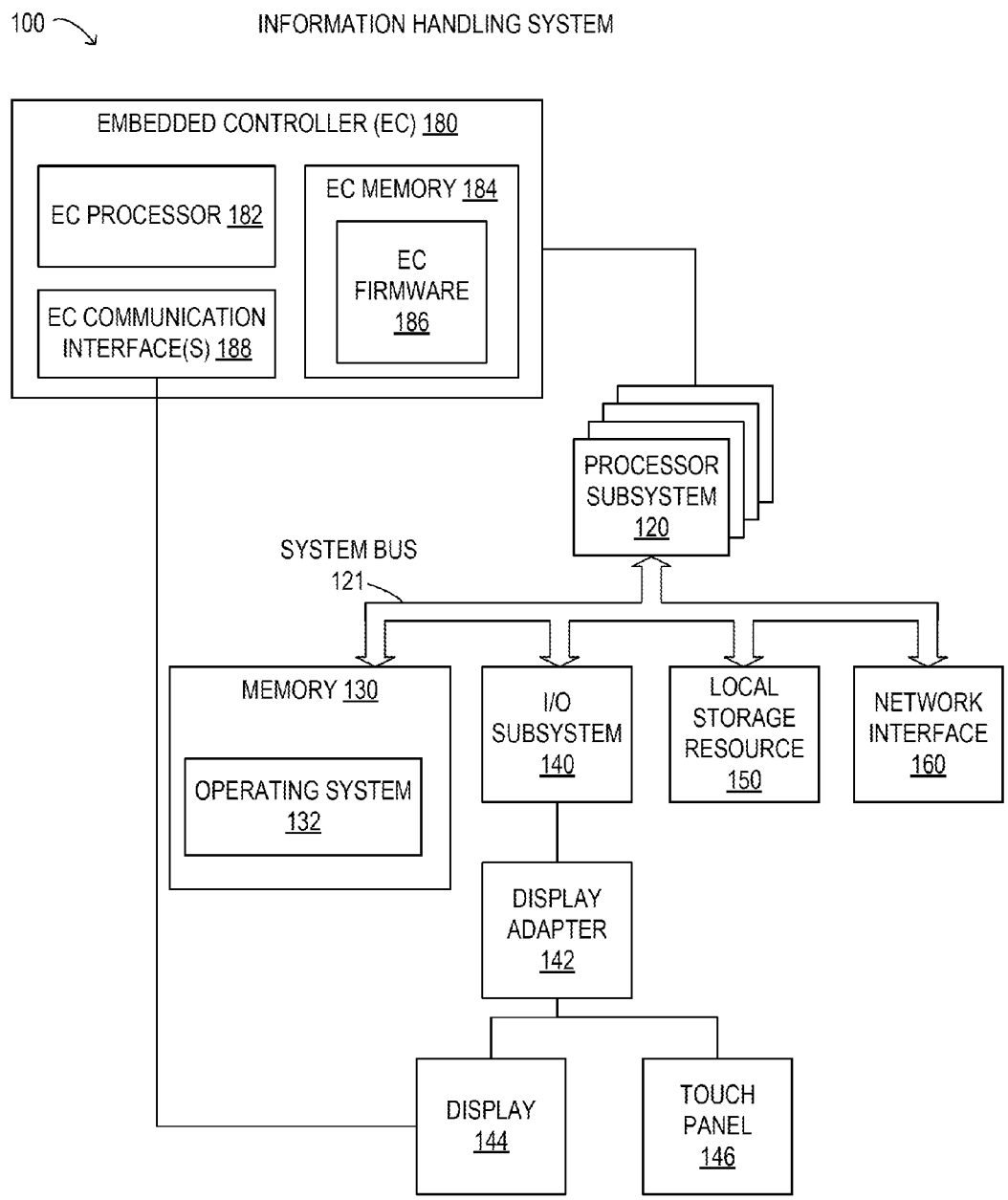
FIG. 1 is a block diagram of selected elements of an embodiment of an information handling system including pre-boot diagnostic display functionality, according to the present disclosure.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Additionally, the information handling system may include firmware for controlling and/or communicating with, for example, hard drives, network circuitry, memory devices, I/O devices, and other peripheral devices. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Figure 2:
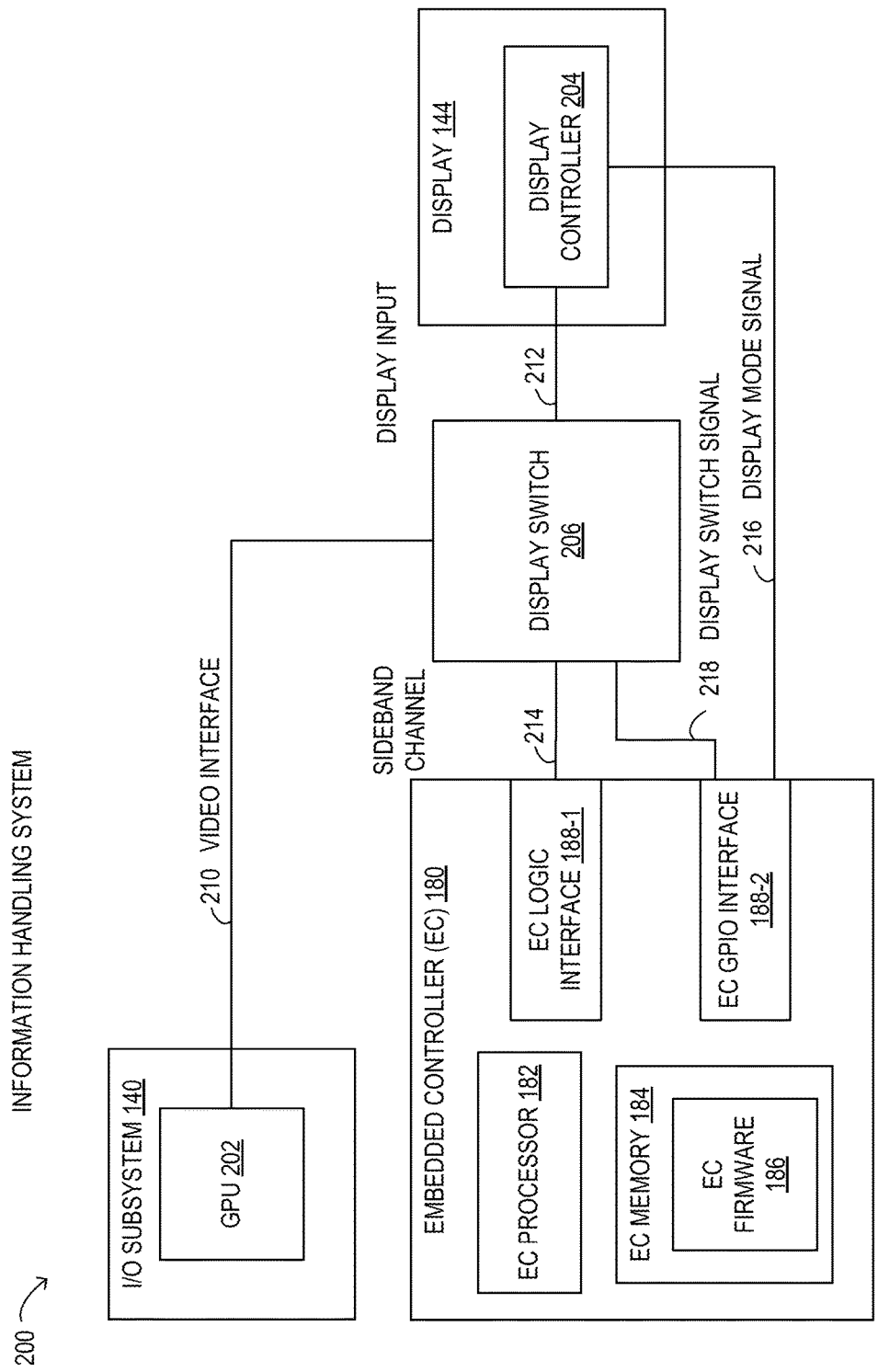
FIG. 2 is a block diagram of selected elements of an embodiment of an information handling system including pre-boot diagnostic display functionality, according to the present disclosure.
Figure 3:
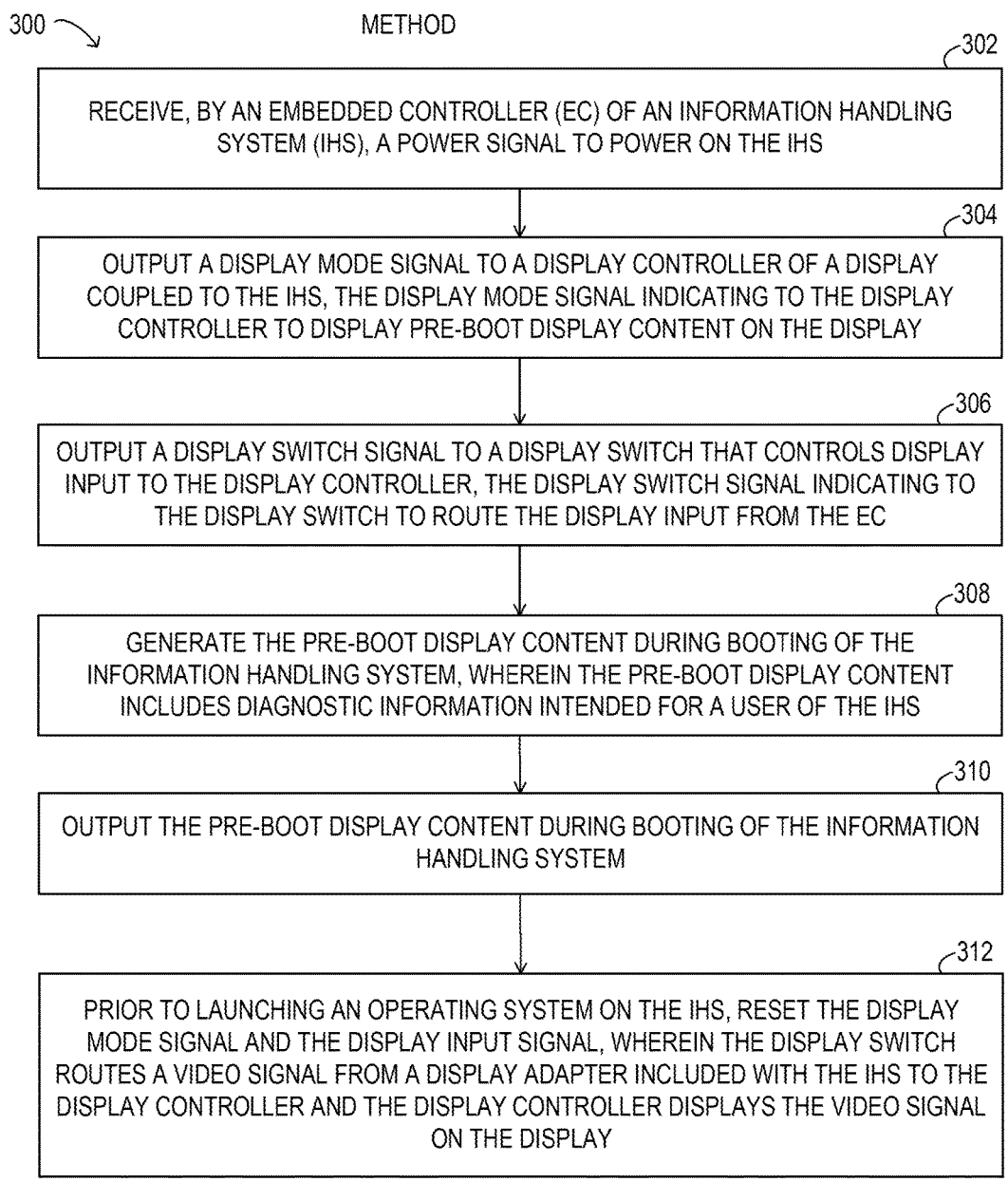
FIG. 3 is a flowchart depicting selected elements of an embodiment of a method for pre-boot diagnostic display functionality, according to the present disclosure.

Particular embodiments are best understood by reference to FIGS. 1, 2, and 3 wherein like numbers are used to indicate like and corresponding parts.

Turning now to the drawings, FIG. 1 illustrates a block diagram depicting selected elements of an embodiment of information handling system 100. As shown in FIG. 1, components of information handling system 100 may include, but are not limited to, processor subsystem 120, which may comprise one or more processors, and system bus 121 that communicatively couples various system components to processor subsystem 120 including, for example, memory 130, I/O subsystem 140, local storage resource 150, and network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 may be a suitable system, apparatus, or device operable to serve as an interface between information handling system 100 and a network (not shown). Network interface 160 may enable information handling system 100 to communicate over the network using a suitable transmission protocol and/or standard. In some embodiments, network interface 160 may be communicatively coupled via the network to a network storage resource. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). The network may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory 130 and/or another component of physical hardware 102). In the same or alternative embodiments, processor subsystem 120 may interpret and/or execute program instructions and/or process data stored remotely (e.g., in a network storage resource).

Also in FIG. 1, memory 130 may comprise a system, device, or apparatus operable to retain and/or retrieve program instructions and/or data for a period of time (e.g., computer-readable media). As shown in the example embodiment of FIG. 1, memory 130 stores operating system 132, which may represent instructions executable by processor subsystem 120 to operate information handling system 100 after booting. It is noted that in different embodiments, operating system 132 may be stored at the network storage resource and may be accessed by processor subsystem 120 via the network Memory 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as information handling system 100, is powered down.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. For example, local storage resource 150 may store executable code in the form of program files that may be loaded into memory 130 for execution, such as operating system 132. In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. For example, I/O subsystem 140 may include a Peripheral Component Interconnect Express (PCI-E) interface that is supported by processor subsystem 120. Often I/O subsystem 140 is referred to as a "chipset" to indicate a collection of integrated circuits that are usable with a given implementation of processor subsystem 120. As shown, I/O subsystem 140 supports an interface to display adapter 142, which enables operation of display 144 and touch panel 146. Touch panel 146 may include circuitry for enabling touch functionality in conjunction with display 146 that is driven by display adapter 142. In many implementations of information handling system 100, display adapter 142 and/or display 146 may be integrated into a single unit that forms information handling system 100, for example, when information handling system 100 is a portable information handling system, such as a laptop, notebook, netbook, or tablet system, or when information handling system is a 2-in-1 (laptop and tablet) or all-in-one system. In particular, display adapter 142 and display 146 may support DisplayPort, a digital display interface developed by VESA. It is noted that in certain embodiments, for example when display adapter 142 includes a graphics processing unit (GPU), display adapter 142 may be integrated within I/O subsystem 140 (see FIG. 2).

Also shown in FIG. 1 is embedded controller (EC) 180, which may include EC processor 182 as a second processor included with information handling system 100 certain management tasks, including pre-boot diagnostic display, as disclosed herein. EC processor 182 may have access to EC memory 184, which may store EC firmware 186, representing instructions executable by EC processor 182. EC firmware 186 may represent pre-boot instructions executable by EC processor 182, for example, for preparing information handling system 100 to boot by activating various hardware components in preparation of launching operating system 132 for execution (also referred to as a basic input/output system (BIOS)). In certain embodiments, EC firmware 186 includes a Unified Extensible Firmware Interface (UEFI) according to a specification promulgated by the UEFI Forum (uefi.org). Embedded controller 180 may execute EC firmware 186 on EC processor 182 even when other components in information handling system 100 are inoperable. Furthermore, EC firmware 186 may be in control of EC communication interface(s) 188, which may represent one or more input/output interfaces or signals that embedded controller 180 can use to communicate with other elements of information handling system 100 (see also FIG. 2).

In operation, when information handling system 100 is powered on, booted, or rebooted (i.e., started or restarted), EC firmware 186 may detect the power on event and may proceed to perform a power on self-test (POST), while activating various hardware components in the process. However, prior to initiating POST, EC firmware 186 may enable pre-boot diagnostic display using display 144 to display pre-boot diagnostic information about information handling system 100 to a user. Specifically, EC firmware 186 may activate certain ones of EC communication interface(s) 188 to enable display to support the pre-boot diagnostic display mode. Then, EC firmware 186 may use certain ones of EC communication interface(s) 188 to emulate an interface to display 144 to output pre-boot diagnostic display content to display 144. It is noted that when display 144 supports DisplayPort or embeddedDisplayPort (eDP), the interface emulated by EC communication interface(s) 188 may include a sideband channel, such as the AUX channel included with DisplayPort or eDP.

Referring now to FIG. 2, a block diagram of selected elements of an embodiment of information handling system 200 is illustrated. Information handling system 200 may represent an embodiment of information handling system 100 (see FIG. 1) and depicts certain elements related to pre-boot diagnostic display in further detail, while omitting other elements for descriptive clarity. As shown, information handling system 200 includes I/O subsystem 140, which is shown including GPU 202, representing an instance of display adapter 142, that outputs video interface 210 to display switch 206. Video interface 210 may represent an instance of a DisplayPort interface. Display switch 206 may output display input 212 to display controller 204, which represents a processor (such as a timing controller) for display 144. Thus, display controller 204 may receive display input 212, which may include commands and display data, and generates a corresponding display (such as image or video output) on display 144. During 'regular' operation of information handling system 200, that is, after operating system 132 has booted and is executing, display switch 206 may simply route video interface 210 to display input 212.

Also shown in FIG. 2 with information handling system 200 is embedded controller (EC) 180 with EC processor 182 and EC memory 184, which stores EC firmware 186. Also depicted in information handling system 200 are two particular instances of EC communication interface(s) 188, namely EC logic interface 188-1 and EC GPIO interface 188-2. EC logic interface 188-1 may be usable by EC firmware 186 to generate (or emulate) various types of logic signals, including timed or synchronized signals, such as sideband channel 214 of video interface 210, among others. EC GPIO interface 188-2 may be usable by EC firmware 186 to output static digital or logic signals that may be asynchronous with respect to a clock or timing signal. Assertion of EC GPIO interface 188-2 signals may be of either polarity (digital high or digital low) in given embodiments. As shown, EC GPIO interface 188-2 generates display mode signal 216 and display switch signal 218. Display mode signal 216 may be used to indicate pre-diagnostic display mode to display controller 204 when asserted. When display controller 204 detects that display mode signal 216 is asserted, display controller 204 may correspondingly expect pre-diagnostic display content to be provided at display input 212. Display switch signal 218 may be used to control display switch 206. When asserted, display switch signal 218 may indicate to display switch 206 to route sideband channel 214 to display input 212 instead of video interface 210. In this manner, before information handling system 200 has booted and before I/O subsystem 140 is activated or powered on, embedded controller (EC) 180 may communicate with display controller 204 and may generate sideband channel 214 to display pre-boot diagnostic content to a user on display 144.

It is noted that the pre-boot diagnostic content (not shown) may be various kinds of content displayed on display 144. In one embodiment, the pre-boot diagnostic content may be generated by EC firmware 186. In other instances, at least a portion of the pre-boot diagnostic content may be stored with display 144 in an internal memory (not shown) and may be referenced by EC firmware 186. The pre-boot diagnostic content may include textual content, graphical content, imagery, video, among other types of desired content. The pre-boot diagnostic content may include or indicate a status of a hardware component that is being activated during POST. The status displayed as pre-boot diagnostic content may include an error message associated with the hardware component. For example, the pre-boot diagnostic content may include a battery symbol with an indication of a battery charge when information handling system 200 includes a battery. Other pre-boot diagnostic content may be generated for display to a user of information handling system 200. In this manner, the value and ease of understanding of the pre-boot diagnostic content provided to the user may be significantly improved for various different hardware components included with information handling system 200.

Referring now to FIG. 3, a block diagram of selected elements of an embodiment of method 300 for pre-boot diagnostic display, as described herein, is depicted in flowchart form. Method 300 may be performed using information handling system 100 (see FIG. 1) and, in particular, by EC firmware 186 of embedded controller 180 executing on EC processor 182. It is noted that certain operations described in method 300 may be optional or may be rearranged in different embodiments.

Method 300 begins by receiving (operation 302), by an embedded controller of an information handling system, a power signal to power on the information handling system. The power signal may be received in response to a user activating a power switch of the information handling system. A display mode signal may be output (operation 304) to a display controller of a display coupled to the information handling system, the display mode signal indicating to the display controller to display pre-boot display content on the display. A display switch signal may be output (operation 306) to a display switch that controls display input to the display controller, the display switch signal indicating to the display switch to route the display input from the embedded controller. It is noted that in certain embodiments, the display switch signal may be combined with the display mode signal. The display switch signal and the display mode signal may be GPIO signals. The pre-boot display content may be generated (operation 308) during booting of the information handling system, wherein the pre-boot display content includes diagnostic information intended for a user of the information handling system. The diagnostic information may describe a state of one or more hardware components that are activated upon booting the information handling system. In certain embodiments, the diagnostic information includes information indicating that no errors occurred in the information handling system. The pre-boot display content may be output (operation 310) during booting of the information handling system. The pre-boot display content is output on the display to the user. Prior to launching an operating system on the information handling system, the display mode signal and the display input signal may be reset (operation 312), wherein the display switch routes a video signal from a display adapter included with the information handling system to the display controller and the display controller displays the video signal on the display. The reset of the display mode signal and the display input signal may involve deassertion of GPIO signals.

As disclosed herein, pre-boot diagnostic display may be controlled by an embedded controller of an information handling system. The embedded controller may generate pre-boot diagnostic content during power on self-test (POST) of the information handling system. The pre-boot diagnostic content may be displayed to a user on a primary display of the information handling system during POST and before the information handling system is booted to an operating system.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method, comprising:
receiving, by an embedded controller of an information handling system, a power signal to power on the information handling system, wherein the embedded controller is a second processor device having access to a second memory, wherein the information handling system includes a first processor device having access to a first memory separate from the second memory;
responsive to receiving the power signal, outputting a display mode signal to a display controller of a display coupled to the information handling system, the display mode signal indicating to the display controller to display pre-boot display content on the display; and
prior to initiating booting of the information handling system, outputting the pre-boot display content to the display controller; and
initiating booting of the information handling system;
generating modifying the pre-boot display content during booting of the information handling system; and
outputting the modified pre-boot display content during the booting using a logic interface, wherein the logic interface emulates a sideband channel of a video interface to the display controller.

2. The method of claim 1, wherein outputting the display mode signal includes outputting a first general purpose input/output signal to the display controller.

3. The method of claim 2, wherein outputting the display mode signal includes outputting a second general purpose input/output signal to a display switch that controls display input to the display controller, the second general purpose input/output signal indicating to the display switch to route the display input from the embedded controller.

4. The method of claim 1, wherein the pre-boot display content is indicative of a status of a hardware component included in the information handling system.

5. The method of claim 4, wherein the pre-boot display content includes an error message associated with the hardware component.

6. The method of claim 1, wherein the pre-boot display content includes diagnostic information intended for a user of the information handling system.

7. An information handling system, comprising:
a processor subsystem having access to a first memory;
an embedded controller comprising a secondary processor having access to a second memory separate from the first memory, the second memory storing instructions executable by the secondary processor to:
receive a power signal to power on the information handling system; responsive to receiving the power signal, output a display mode signal to a display controller of a display coupled to the information handling system, the display mode signal indicating to the display controller to display pre-boot display content on the display; and
prior to initiating booting of the information handling system on the processor subsystem, output the pre-boot display content to the display controller; and
initiate booting of the information handling system;
modify the pre-boot display content during booting of the information handling system; and
output the modified pre-boot display content to the display controller during the booting using a logic interface, wherein the logic interface emulates a sideband channel of a video interface to the display controller.

8. The information handling system of claim 1, wherein the instructions to output the display mode signal include instructions to output a first general purpose input/output signal to the display controller.

9. The information handling system of claim 8, further comprising:
a display switch that controls display input to the display controller,
wherein the instructions to output the display mode signal include instructions to output a second general purpose input/output signal to the display switch, the second general purpose input/output signal indicating to the display switch to route the display input from the embedded controller.

10. The information handling system of claim 7, wherein the pre-boot display content is indicative of a status of a hardware component included in the information handling system.

11. The information handling system of claim 10, wherein the pre-boot display content includes an error message associated with the hardware component.

12. The information handling system of claim 7, wherein the pre-boot display content includes diagnostic information intended for a user of the information handling system.

13. An embedded controller for an information handling system having a primary processor and a primary memory, the embedded controller comprising:
a secondary processor having access to a second memory separate from the primary memory, the second memory storing instructions executable by the secondary processor to:
receive a power signal to power on the information handling system;
responsive to receiving the power signal, output a display mode signal to a display controller of a display coupled to the information handling system, the display mode signal indicating to the display controller to display pre-boot display content on the display; and
prior to initiating booting of the information handling system, output the pre-boot display content to the display controller; and
modify the pre-boot display content during booting of the information handling system; and
output the modified pre-boot display content during the booting to the display controller using a logic interface,
wherein the logic interface emulates a sideband channel of a video interface to the display controller.

14. The embedded controller of claim 13, wherein the instructions to output the display mode signal include instructions to output a first general purpose input/output signal to the display controller.

15. The embedded controller of claim 14, wherein the instructions to output the display mode signal include instructions to output a second general purpose input/output signal to a display switch that controls display input to the display controller, the second general purpose input/output signal indicating to the display switch to route the display input from the embedded controller.

16. The embedded controller of claim 13, wherein the pre-boot display content is indicative of a status of a hardware component included in the information handling system, wherein the status includes error messages for the hardware component.

17. The embedded controller of claim 13, wherein the pre-boot display content includes diagnostic information intended for a user of the information handling system.

* * * * *